US008213580B2

(12) United States Patent
Chen et al.

(10) Patent No.: US 8,213,580 B2
(45) Date of Patent: Jul. 3, 2012

(54) AUTOMATED MESSAGE CONVERSION BASED ON AVAILABILITY OF BANDWIDTH

(75) Inventors: Yen-Fu Chen, Austin, TX (US); Fabian F. Morgan, Austin, TX (US); Keith Raymond Walker, Austin, TX (US); Sarah Vijoya White Eagle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1286 days.

(21) Appl. No.: 11/924,405

(22) Filed: Oct. 25, 2007

(65) Prior Publication Data

US 2009/0110158 A1    Apr. 30, 2009

(51) Int. Cl.
*H04M 1/64* (2006.01)
*H04M 11/00* (2006.01)

(52) U.S. Cl. ............... 379/88.14; 379/88.11; 379/88.12; 379/88.13; 379/88.17; 379/88.26; 455/412.2; 455/413; 455/466

(58) Field of Classification Search .... 379/88.11–88.14, 379/88.17, 88.26; 455/412.2, 413, 466
See application file for complete search history.

(56) References Cited

U.S. PATENT DOCUMENTS

| | | | |
|---|---|---|---|
| 5,493,609 A | 2/1996 | Winseck, Jr. et al. | |
| 6,684,088 B1 * | 1/2004 | Halahmi | 455/566 |
| 6,813,601 B1 * | 11/2004 | Hedinger | 704/221 |
| 6,816,578 B1 | 11/2004 | Kredo et al. | |
| 6,957,077 B2 | 10/2005 | Dehlin | |
| 7,027,568 B1 * | 4/2006 | Simpson et al. | 379/88.16 |
| 7,065,185 B1 | 6/2006 | Koch | |
| 7,130,401 B2 | 10/2006 | Rampey et al. | |
| 7,376,434 B2 * | 5/2008 | Thomas et al. | 455/466 |
| 7,395,078 B2 * | 7/2008 | Roth | 455/466 |
| 7,630,705 B2 * | 12/2009 | Galicia et al. | 455/414.1 |
| 8,112,104 B1 * | 2/2012 | Thomas et al. | 455/466 |
| 2002/0034956 A1 * | 3/2002 | Mekuria | 455/466 |
| 2003/0120489 A1 * | 6/2003 | Krasnansky et al. | 704/235 |
| 2004/0110494 A1 * | 6/2004 | Cohen et al. | 455/414.1 |
| 2004/0121785 A1 | 6/2004 | Vance, Jr. et al. | |
| 2004/0267527 A1 * | 12/2004 | Creamer et al. | 704/235 |
| 2005/0037741 A1 * | 2/2005 | Gilbert | 455/414.1 |
| 2005/0119018 A1 * | 6/2005 | Kim | 455/466 |
| 2006/0168150 A1 * | 7/2006 | Naik et al. | 709/219 |
| 2006/0276210 A1 * | 12/2006 | Thomas et al. | 455/466 |
| 2008/0039966 A1 * | 2/2008 | Redgewell et al. | 700/94 |
| 2009/0003569 A1 * | 1/2009 | Forbes et al. | 379/142.07 |
| 2010/0056118 A1 * | 3/2010 | Galicia et al. | 455/414.4 |
| 2011/0116610 A1 * | 5/2011 | Shaw et al. | 379/88.04 |

\* cited by examiner

*Primary Examiner* — Lisa Hashem
(74) *Attorney, Agent, or Firm* — Yee & Associates, P.C.; Mark C. Vallone (57) ABSTRACT

A method, apparatus, and computer usable program product for managing a communications session. The process monitors a bandwidth of the communications device in response to detecting an exchange of audio-based messages on a communications device. In response to detecting the bandwidth below a threshold, the process converts a subsequent outgoing audio-based message into an outgoing text-based message and associates a low bandwidth indicator to the outgoing text-based message to form a distinguished text-based message. The process then transmits the distinguished text-based message for receipt by an intended recipient.

18 Claims, 6 Drawing Sheets

AUTOMATED MESSAGE CONVERSION BASED ON AVAILABILITY OF BANDWIDTH

BACKGROUND OF THE INVENTION

1. Field of the Invention

The present invention relates generally to an improved data processing system and in particular to a computer implemented method and apparatus for managing communication. More particularly, the present invention is directed to a computer implemented method, apparatus, and computer usable program product for automated message conversion based on availability of bandwidth.

2. Description of the Related Art

Most, if not all users of communications devices, such as, cell phones and voice over Internet Protocol (VOIP) phones have experienced some form of disintegration of audio quality resulting in conversations where the other participant's voice is broken up and unintelligible. With respect to cell phones, many factors may contribute to this disintegration of audio quality. Cell phones operate by transmitting information via radio waves that travel through air from a cell phone tower to a cell phone. These radio waves, however, are easily attenuated, resulting in varying degrees of available bandwidth. An amount of bandwidth may be correlated to a signal strength of a cell phone. The signal strength indicates the degree of attenuation, and hence, the amount of bandwidth that is capable of transmitting data. For example, distance from a cell phone tower; composition of nearby terrain, such as the existence of large buildings, hills, or excessive foliage; destructive interference from other signals, especially in urban areas; or the presence inside a structure, such as a tunnel, elevator, or building, all may affect a cell phone's ability to receive a strong signal from a cell phone tower.

Users of voice over Internet Protocol (VOIP) phones may also experience similar difficulties understanding one another. Voice over Internet Protocol conversations utilize the Internet at the communications link. The disintegration of audio quality, with respect to voice over Internet Protocol communications sessions, is attributed to an insufficient amount of bandwidth for transmitting and receiving data. The lack of sufficient bandwidth may be a sporadic occurrence, and may be caused by an increasing amount of Internet traffic at certain times of the day.

Currently, participants of a conversation experiencing disintegrated audio quality as a result of insufficient bandwidth may attempt to continue the conversation despite the interruptions and difficulties discerning the spoken words. However, the participants may become increasingly frustrated at one another after receiving repeated requests to repeat portions of conversation. In addition, participants of the conversation may misunderstand important topics of conversation which may have significant consequences.

Alternatively, participants of such an interrupted conversation may elect to reconvene at a later time to resume the conversation. However, one or both of the parties may be busy or unavailable, or may forget the topic of conversation. Therefore, it would be advantageous to have a method and apparatus that overcomes these problems.

SUMMARY OF THE INVENTION

The illustrative embodiments described herein provide a computer implemented method, apparatus, and computer usable program product for managing a communications session. The process monitors a bandwidth of the communications device in response to detecting an exchange of audio based messages on a communications device. In response to detecting the bandwidth below a threshold, the process converts a subsequent outgoing audio based-message into an outgoing text-based message and associates a low bandwidth indicator to the outgoing text-based message to form a distinguished text-based message. The process then transmits the distinguished text-based message for receipt by an intended recipient.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
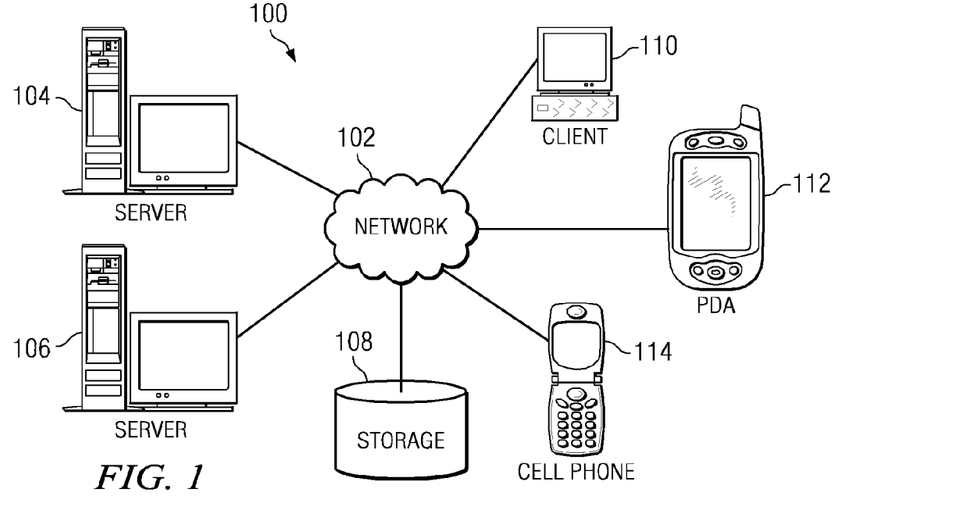
FIG. 1 is a pictorial representation of a network data processing system in which illustrative embodiments may be implemented.
Figure 2:
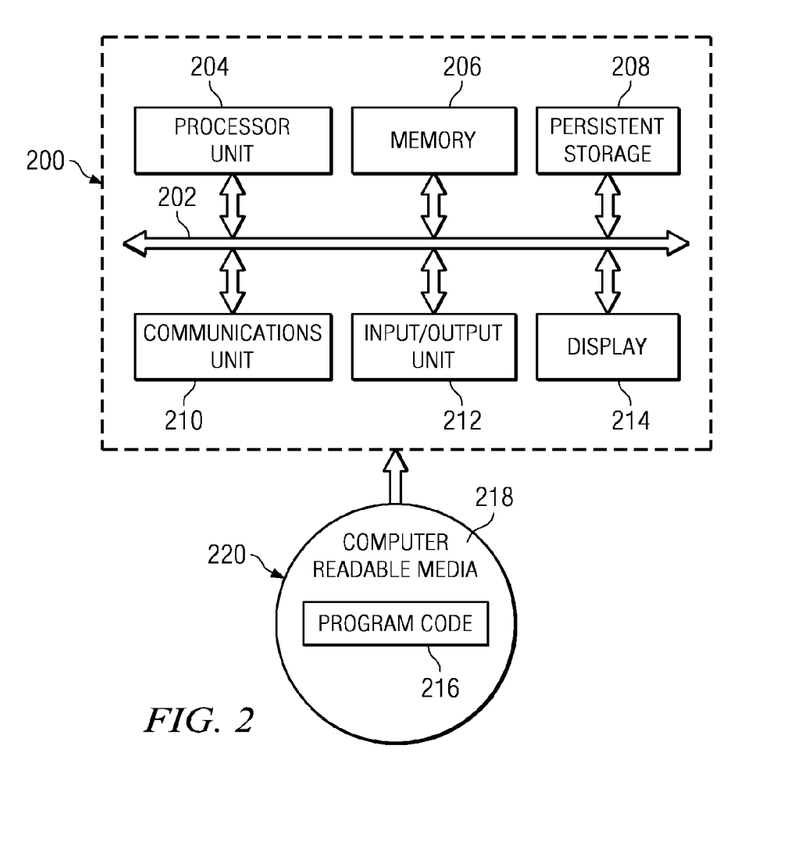
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network data processing system in which illustrative embodiments may be implemented. Network data processing system 100 is a network of computing devices in which embodiments may be implemented. Network data processing system 100 contains network 102, which is the medium used to provide communications links between various devices and computers connected together within network data processing system 100. Network 102 may include connections, such as wire, wireless communication links, or fiber optic cables. The depicted example in FIG. 1 is not meant to imply architectural limitations. For example, data processing system 100 also may be a network of telephone subscribers and users.

In the depicted example, server 104 and server 106 connect to network 102 along with storage unit 108. In addition, client 110, personal digital assistant (PDA) 112, and cell phone 114 are coupled to network 102. Client 110, personal digital assistant (PDA) 112, and cell phone 114 are examples of communications devices that may be utilized for transmitting or receiving audio-based communication in a network, such as network 102. Client 110, may be, for example, a personal computer, a laptop, a tablet PC, a network computer, a hardwired telephone, a voice over Internet communication device, or any other communication device or computing device capable of transmitting data.

Participants of a communications session may utilize client 110, personal digital assistant (PDA) 112, and cell phone 114 for exchanging audio-based messages and text-based messages. The audio-based messages and text-based messages may be converted from one type to another according to a bandwidth of the communications devices. In the depicted example, server 104 provides data, such as boot files, operating system images, and applications to client 110, personal digital assistant (PDA) 112, and cell phone 114. Client 110, personal digital assistant (PDA) 112, and cell phone 114 are coupled to server 104 in this example. The processes of the embodiments presented herein for automated message conversion may be implemented in data processing systems, such as client 110, personal digital assistant (PDA) 112, and cell phone 114.

Network data processing system 100 may include additional servers, clients, computing devices, and other devices for transmitting or receiving audio-based communication. The clients and servers of network data processing system 100 may be configured to host one or more software components that form a distributed software application. Alternatively, the clients and servers of network data processing system 100 may host one or more virtual machines for hosting one or more software components that form a distributed software application.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, for example, an intranet, a local area network (LAN), a wide area network (WAN), a telephone network, or a satellite network. FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104, client 110, personal digital assistant (PDA) 112, and cell phone 114 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, memory 206 or a cache. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

The illustrative embodiments described herein provide a computer implemented method, apparatus, and computer usable program product for managing a communications session. A communication session is an exchange of informational messages between participants. The information may be conveyed in the form of audio-based messages or text-based messages.

The process monitors a bandwidth of a communications device in response to detecting an exchange of audio-based messages on a communications device. In response to detecting the bandwidth below a threshold, the process converts a subsequent outgoing audio-based message into an outgoing text-based message. The subsequent outgoing audio-based message is an audio-based message that would have been generated and transmitted to an intended recipient. However, because of a low bandwidth, the information that would have been included in the subsequent outgoing audio-based message is incorporated into the outgoing text-based message.

The process then associates a low bandwidth indicator to the outgoing text-based message to form a distinguished text-based message. The distinguished text-based message is a text-based message associated with a low bandwidth indicator. The distinguished text-based message includes information that would have otherwise been included in the subsequent outgoing audio-based message. The process then transmits the distinguished text-based message for receipt by an intended recipient.

In one embodiment, a user operating a communications device having a bandwidth below a threshold is prompted to generate a text-based message to continue a communication session. If, however, the communications device includes a message converter, then the communication device may automatically convert an audio-based message, which in this case is a spoken message, to a text-based message for delivery to the other participant of the communications session.

A message converter is a software application operable to convert messages from audio-based messages to text-based messages and text-based messages to audio-based messages. For example, a message converter may be a speech-to-text software application, such as the Dragon NaturallySpeaking®. Dragon NaturallySPeaking is a registered trademark of ScanSoft, Inc. In addition, a message converter may be a text-to-speech software application, such as NaturalReader. NaturalReader is a product offered by NaturalSoft, Ltd.

The text-based message may be intercepted by or transmitted to a communications gateway before the text-based message is delivered to the intended recipient. The communications gateway may convert the text-based communication to an audio-based message before transmitting the message to the intended recipient. Alternatively, the communications gateway may direct the text-based communication to the intended recipient, and the recipient's communication device may convert the text-based communication to an audio-based message before the message is delivered to the intended recipient.

Thus, the message converter operable to convert between text-based messages and audio-based messages may be included in at least one of the receiving communications device and the communications gateway. In other words, the message converter may be included in either the receiving communications device, the communications gateway, or both.

The communications gateway may also convert audio-based messages to text-based messages if the communications gateway determines that the audio-based message is associated with a low bandwidth indicator and/or the audio-based message is intended for delivery to a user operating a communications device having a bandwidth below a threshold level. As used herein, the communications device having a bandwidth below a threshold level may also be referred to in the alternative as a low bandwidth communications device.

The recipient of the message generated by the user of the low bandwidth communications device responds to the message via text-based communication. In one embodiment, the recipient of the message generates a text-based message for delivery to the sender of the original message. In another embodiment, the recipient continues speaking, generating an audio-based message that is then converted into a text-based message by the communications device or alternatively, by the communications gateway. The text-based message is then delivered to the user operating the low bandwidth strength communications device.

Figure 3:
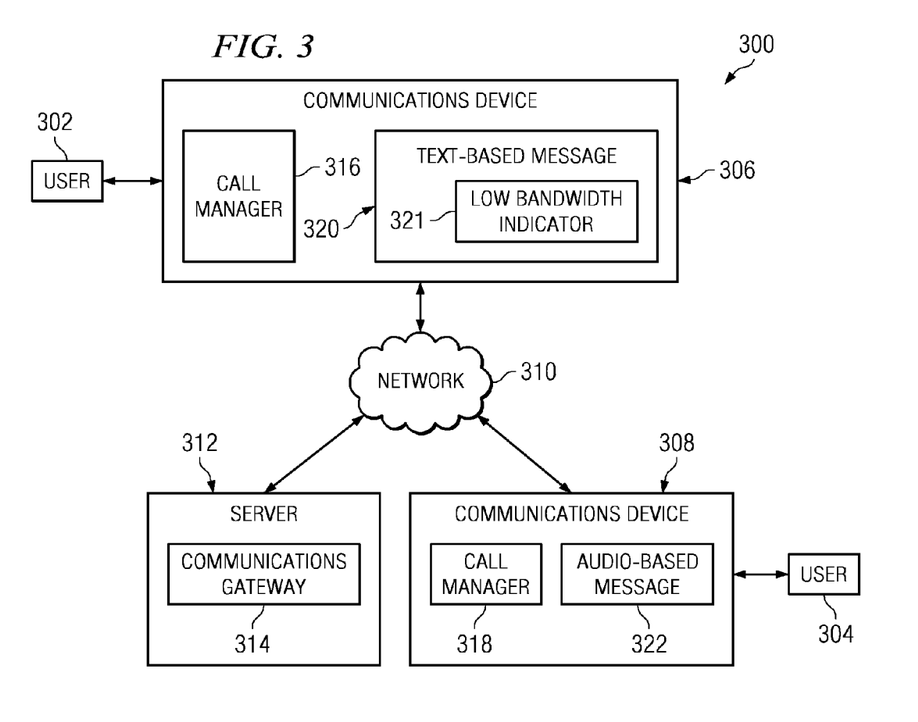
FIG. 3 is a diagram of a data processing system for managing communications sessions in accordance with an illustrative embodiment.

FIG. 3 is a diagram of a data processing system for managing communications sessions in accordance with an illustrative embodiment. Data processing system 300 is a data processing system such as network data processing system 100 in FIG. 1.

In this illustrative example in FIG. 3, network data processing system 300 facilitates a communications session between users 302 and 304. Users 302 and 304 communicate through the operation of communications devices 306 and 308, respectively. Communications devices 306 and 308 are communications devices, such as client 110, personal digital assistant (PDA) 112, and cell phone 114 in FIG. 1. Communications devices 306 and 308 are coupled to network 310. Network 310 is a network, such as network 102 in FIG. 1.

A communications session in which users 302 and 304 participate may be audio-based communication or text-based communication. Audio-based communication is communication involving the exchange of audio-based information. Audio-based information is information that is heard by the parties to a communication session. The audio-based information may be, for example, spoken words, recorded words, computer generated words, or other forms of audio-based messaging.

Text-based communication is communication involving the exchange of text-based information. Text-based information is information formed from alphanumeric strings of text, such as words, acronyms, and abbreviations. Text-based information may be conveyed using, without limitation, text messages, emails, instant messages, and other forms of text-based messaging.

Server 312 also connects to network 310. Server 312 is a computing device, such as client 110 and servers 104 and 106 in FIG. 1. Server 312 hosts communication gateway 314. Communications gateway 314 is a multifunctional component of system 300. Communications gateway 314 may be implemented as a software component, or a combination of software and hardware. A primary function of communications gateway 314 is to facilitate the transfer of messages from a sender to a recipient. In particular, communications gateway 314 is responsible for forwarding messages generated by one user to the intended recipient. The messages may be text-based messages or audio-based messages.

Prior to forwarding messages to the intended recipient, communications gateway 314 may convert the messages from one form to another. In particular, communications gateway 314 may convert a text-based message to an audio-based message, or may convert an audio-based message to a text-based message. A text-based message is a message conveying text-based information, as described above. Likewise, an audio-based message is a message conveying audio-based information, as also described above.

The conversion of messages from one type to another by communications gateway 314 is related to the amount of bandwidth available to the recipient of the message. Because text-based messages require less bandwidth to receive, communications gateway 314 may convert audio-based messages to text-based messages before delivery to a user of a low bandwidth communications device. Likewise, text-based messages sent from a low bandwidth communications device may be converted to audio-based messages for delivery to a recipient operating a communications device with sufficient bandwidth to adequately present an audio-based message without interruption and disintegration of audio quality.

Communications devices 306 and 308 include call managers 316 and 318, respectively. Call managers 316 and 318 are software components that manage the communication session between users 302 and 304. The operation of call managers 316 and 318 depends, in part, upon whether its respective communications device is determined to be a low bandwidth communication device or not. The threshold bandwidth may be predetermined based upon a known amount of bandwidth that may permit users to carry on conversations without interruption or disintegration of audio quality. A communications device operating at a bandwidth less than the threshold bandwidth may be designated as a low bandwidth communications device.

A call manager may monitor a bandwidth of its respective communications device by any available or later developed means. For example, if communications device 306 is a cell phone, call manager 316 may monitor a bandwidth of communications device 306 by identifying a signal strength of communications device 306. Low signal strength may mean that communications device 306 is incapable of sending or receiving audio-based messages uninterrupted. In addition, where communications device 306 is a cell phone, call manager 316 may monitor a distance of communications device 306 from a cell phone tower and calculate an estimated available bandwidth. Large distances may equate to less bandwidth available for sending audio-based messages. In another example, where communications device is a voice over Internet Protocol phone, call manager 316 may monitor a bandwidth of the communications device by periodically sending out test data packets to a remote server to measure the latency of network 310. The latency may be correlated to an available bandwidth of network 310.

In an illustrative example, user 302 begins a communication session with user 304 by the exchange of audio-based messages. In this example, the audio-based messages are spoken words. Users 302 and 304 are communicating by means of communications devices 306 and 308, respectively. Call managers 316 and 318 monitor the bandwidth of their respective communications devices. If, for example, call manager 316 detects that a bandwidth of communications device 306 falls below a threshold, then call manager 316 may initiate a process to convert subsequently generated audio-based messages into text-based messages, such as text-based message 320, for delivery to user 304 operating communications device 308. In this example, the subsequently generated audio-based message is the spoken words of user 302 and text-based message 320 is a text message generated from the audio-based information conveyed by the spoken words of user 302.

Call manager 316 may associate low bandwidth indicator 321 with text-based message 320 so that subsequent software applications receiving and/or processing text-based message 320 may know how to process text-based message 320. Low bandwidth indicator 321 may be any sort of indicator, such as a flag, portion of code, symbol, metadata, or any other indicator indicating that text-based message 320 originated from a low bandwidth communications device. Further, low bandwidth indicator 321 may be attached to or incorporated in text-based message 320, or may be stored as an entry in a database that correlates low bandwidth indicator 321 to text-based message 320.

Before receipt at communications device 308, text-based message 320 may be first delivered to or intercepted by communications gateway 314. Communications gateway 314 identifies the recipient of text-based message 320 and detects the presence of a low bandwidth indicator. In one embodiment, communications gateway 314 converts text-based message 320 back to an audio-based message before delivering the message to user 304, the intended recipient, as audio-based message 322. In an alternate embodiment, communications gateway 314 forwards text-based message 320 to communications device 308. Upon detecting the presence of low bandwidth indicator 321, call manager 318 may convert text-based message 320 to audio-based message 322 before presenting audio-based message 322 to user 304.

Additionally, call manager 318 may notify user 304 that audio-based message 322 originated from a low bandwidth communications device so that user 304 may respond to user 302 via text-based messaging, such as by creating a text message. Furthermore, where communications device 308 is equipped with speech-to-text software, call manager 318 may automatically generate the text-based message based upon the spoken response from user 304. In yet another embodiment, a spoken response from user 304 may be transmitted to communications gateway 314 for conversion into a text-based message before the text-based message is sent back to communications device 306 for receipt by user 302.

In this illustrative example, communications device 308 is not a low bandwidth communications device. If, however, communications device 308 were also temporarily designated as a low bandwidth communications device, then communications device 308 would receive a text-based message, such as text-based message 320, rather than audio-based message 322. In this particular example, communications gateway 314 maintains a database describing the status of the various communications devices participating in an ongoing communication session. Communications gateway 314 may receive periodic status updates from the communications devices, such as communications devices 306 and 308. The periodic updates may be generated by call managers 316 and 318. Thus, communications gateway 314 may easily determine whether a particular communications device is a low bandwidth communications device, and whether or not audio-based messages may be delivered.

Figure 4:
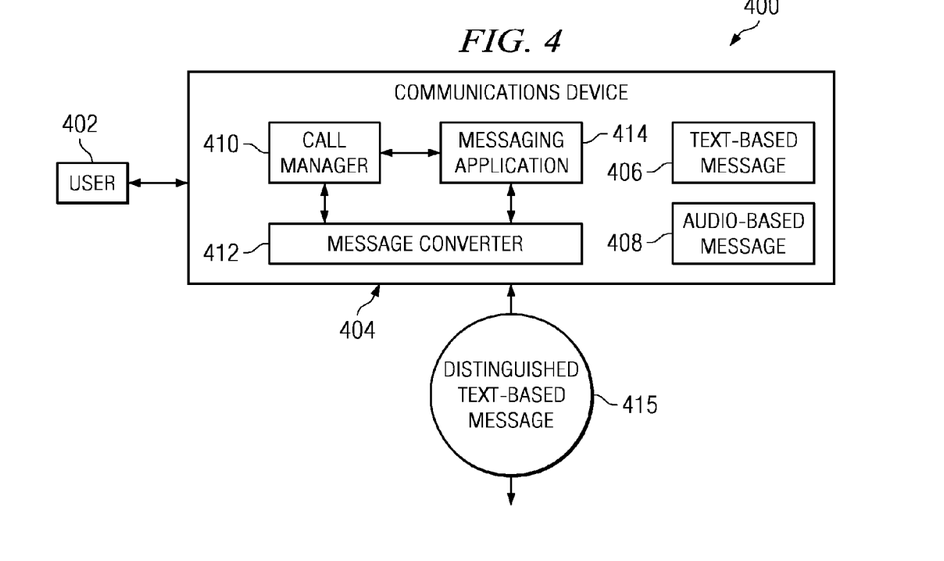
FIG. 4 is a diagram of a communications device for facilitating communications sessions in accordance with an illustrative embodiment.

FIG. 4 is a diagram of a communications device for facilitating communications sessions in accordance with an illustrative embodiment. In particular, the communications device enables a user, such as user 402, to communicate with other users operating communications devices. User 402 is a user, such as users 302 and 304 in FIG. 3. Communications device 404 is a communications device, such as communications devices 306 and 308 in FIG. 3. Communications device 404 facilitates the exchange of text-based message 406 and/or audio-based message 408 based upon a bandwidth of communications device 404.

Text-based message 406 is a text-based message such as text-based message 320 in FIG. 3. Audio-based message 408 is an audio-based message such as audio-based message 322 in FIG. 3.

User 402 may operate communications device 404 to engage in an audio-based communications session with another user. If, however, communications device 404 experiences reduced bandwidth that decreases the bandwidth of communications device 404 below a threshold, then the audio-based communication session may be interrupted, resulting in intermittent delivery of audio-based information, such as audio-based message 408. The management of this communication session is accomplished by call manager 410. Call manager 410 is a call manager such as call manager 316 in FIG. 3.

Because the transmission of audio-based message 408 requires comparatively more bandwidth than the transmission of text-based message 406, call manager 410 may initiate the conversion of audio-based messages to text-based messages generated at communications device 404 if call manager 410 determines that a bandwidth of communications device 404 has dropped below a threshold. Call manager 410 is a software application such as call managers 316 and 318 in FIG. 3.

Call manager 410 initiates the conversion of audio-based messages to text-based messages by directing message converter 412 to capture and convert audio-based information to text-based information. Message converter 412 is a software component of a communications device for converting text-based message 406 to audio-based message 408 and for converting audio-based message 408 to text-based message 406. Message converter 412 may be a commonly available speech-to-text software application or a text-to-speech software application, as described above.

Audio-based message 408 may be the spoken words of user 402, or may originate from the other participant or participants of a communications session. Text-based message 406 may be a text-based message, such as a text message or email generated by user 402 or by the other participant or participants to the communications session.

In an example where user 402 is operating communications device 404, a low bandwidth communications device, message converter 412 and messaging application 414 form text-based message 406 from audio-based message 408, which is an audio-based message originating from user 402. Messaging application 414 is a software application usable for creating and sending text-based messages. Messaging application 414 may be, for example, a text messaging application, an email application, an instant messaging application, or any other type of application that may be used for generating and transmitting text-based messages.

Call manager 410 may associate a low bandwidth indicator, such as low bandwidth indicator 321 in FIG. 3, with text-based message 406 to form distinguished text-based message 415 for subsequent delivery to an intended recipient.

In another example, communications device 404 may be a communications device in communication with a low bandwidth communications device. In this example, call manager 410 may make this determination that communications device 404 is in communication with a low bandwidth communication device by receiving a message, such as distinguished text-based message 415. If call manager 410 receives distinguished text-based message 415, call manager 410 may convert distinguished text-based message 415 into audio-based message 408 for presentation to user 402. Alternatively, call manager 410 may present to user 402 distinguished text-based message 415.

User 402 may respond to the message received from a user operating a low bandwidth communications device by generating text-based message 406 that, in this example, is a responsive text-based message. Alternatively, message converter 412 may convert a spoken response into the responsive text-based message. Text-based message 406 may then be sent as a responsive message to the user of the low bandwidth communications device. Alternatively, if user 402 elects not to respond by generating text-based message 406, and communications device 404 is not equipped with message converter 412, then the spoken response of user 402, depicted as audio-message 408, may be transmitted to a communications gateway for conversion to a text-based message.

Text-based message 406, when generated in response to a message received from a user operating a low bandwidth communications device may include a unique identifier identifying the sender of the text-based message. The identifier may be, for example, a telephone number, username, or other form of identifier that may enable the recipient of text-based message 406 to identify the sender of text-based message 406. Thus, if a user of a low bandwidth communications device is participating in a communications session with more than one other person, then the user may be able to identify the sender of the text-based message.

Figure 5:
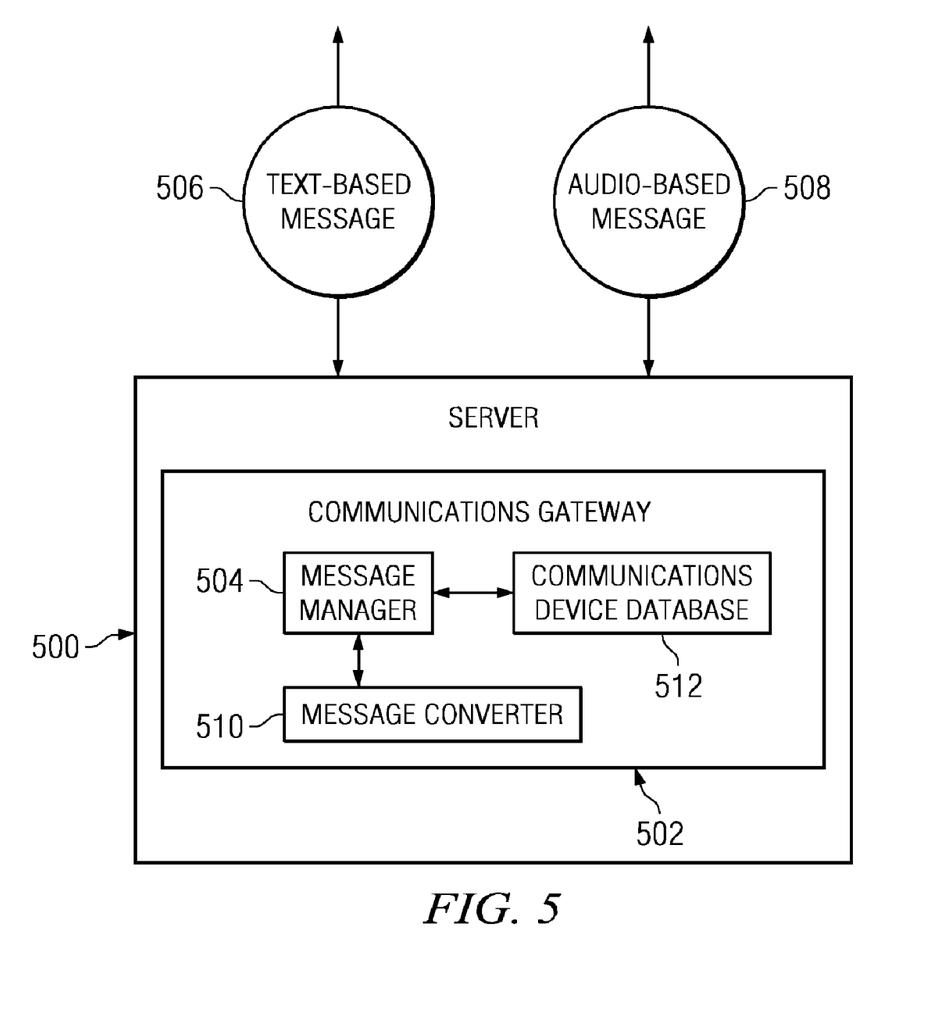
FIG. 5 is a diagram of a system component for facilitating the management of communications sessions in accordance with an illustrative embodiment.

FIG. 5 is a diagram of a system component for facilitating the management of communications sessions in accordance with an illustrative embodiment. Server 500 is a server, such as server 104 and 106 in FIG. 1 and server 312 in FIG. 3. Server 500 hosts communications gateway 502. Communications gateway 502 is a communications gateway such as communications gateway 314 in FIG. 3.

Communications gateway 502 includes message manager 504. Message manager 504 is a software component for managing the delivery of messages throughout a system, such as system 100 in FIG. 1. The messages delivered through the system are text-based message 506 and audio-based message 508. Text-based message 506 is a text-based message such as text-based message 320 in FIG. 3. Likewise, audio-based message 508 is an audio-based message such as audio-based message 322 in FIG. 3.

Message manager 504 identifies a recipient of messages and determines whether or not the messages are associated with a low bandwidth indicator. Message manager 504 insures that a recipient of a message does not receive an audio-based message if the recipient is operating a low bandwidth communications device. Thus, message manager 504 may convert an audio-based message, such as audio-based message 508 into text-based message 506 before delivering to the recipient.

In addition, message manager 504 may direct message converter 510 to convert a text-based message into an audio-based message if the text-based message is associated with a low bandwidth indicator and is directed to a user operating a communications device not experiencing low bandwidth. The message conversions are initiated by message manager 504, but accomplished by message converter 510. Message converter 510 is a message converter such as message converter 412 in FIG. 4.

Communications gateway 502 may be an enhanced short message service (SMS) gateway modified to incorporate message manager 504 and message converter 510. Short message service gateways facilitate the traffic of messages between users of communications devices such as communications devices 306 and 308 in FIG. 3.

Communications gateway 502 includes communications device database 512. Communications device database 512 is a database storing a status of the various communications devices participating in a direct communication session. The status of the communications devices include data describing whether the communications devices may be designated as low bandwidth. Message manager 504 receives and stores periodic status updates from the communications devices, such as communications devices 306 and 308 in FIG. 3. Thus, message manager 504 may easily determine whether a particular communications device is a low bandwidth communications device, and whether or not audio-based messages may be delivered.

Figure 6:
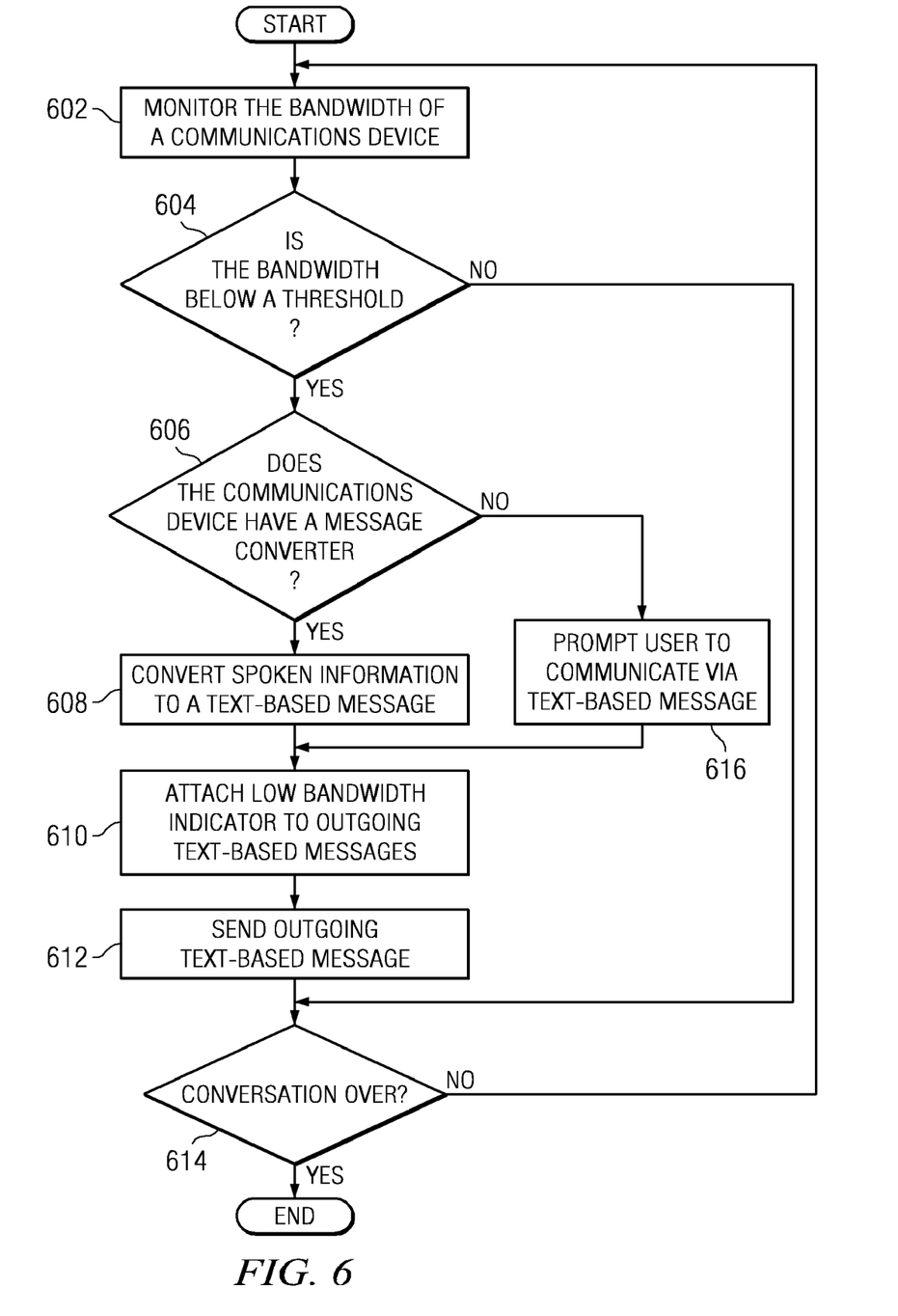
FIG. 6 is a flowchart of a process for processing a communications session on a low bandwidth communications device in accordance with an illustrative embodiment.

FIG. 6 is a flowchart of a process for managing a communications session on a low bandwidth communications device in accordance with an illustrative embodiment. The process may be performed by a software component such as call manager 316 in FIG. 3, during the course of a conversation.

The process begins by monitoring the bandwidth of a communications device (step 602). The communications device may be a cell phone or a voice over Internet Protocol communications device.

The process then makes the determination as to whether the bandwidth is below a threshold (step 604). If the process makes the determination that the bandwidth is below a threshold, then the process makes a subsequent determination as to whether the communications device has a message converter (step 606).

If the process makes the determination that the communications device has a message converter, then the process converts the spoken information to a text-based message (step 608). The text-based message may be an email, a text message, an instant message, or any other text-based form of messaging.

The process then attaches a low bandwidth indicator to the outgoing text-based message (step 610). Thereafter, the process sends the outgoing text-based message (step 612) and the process continues to step 614. In one illustrative example, where the users are operating cell phones, and the text-based message is a text message, the process delivers the text message to a communications gateway. In another example, the outgoing text-based message may be delivered directly to the other participant of the conversation, as in the instance where the users are operating voice over Internet Protocol communications devices.

Returning now to step 604, if the process makes the determination that the bandwidth is not below a threshold, then the process makes the determination as to whether the conversation is over (step 614). If the process makes the determination that the conversation is over, then the process terminates thereafter. However, if the process makes the determination that the conversation is not over, then the process returns to step 602.

Returning now to step 606, if the process makes the determination that the communications device does not have a speech-to-text converter, then the process prompts a user to communicate via text-based message (step 616). In response to the user generating a text-based message, the process continues to step 610.

Figure 7:
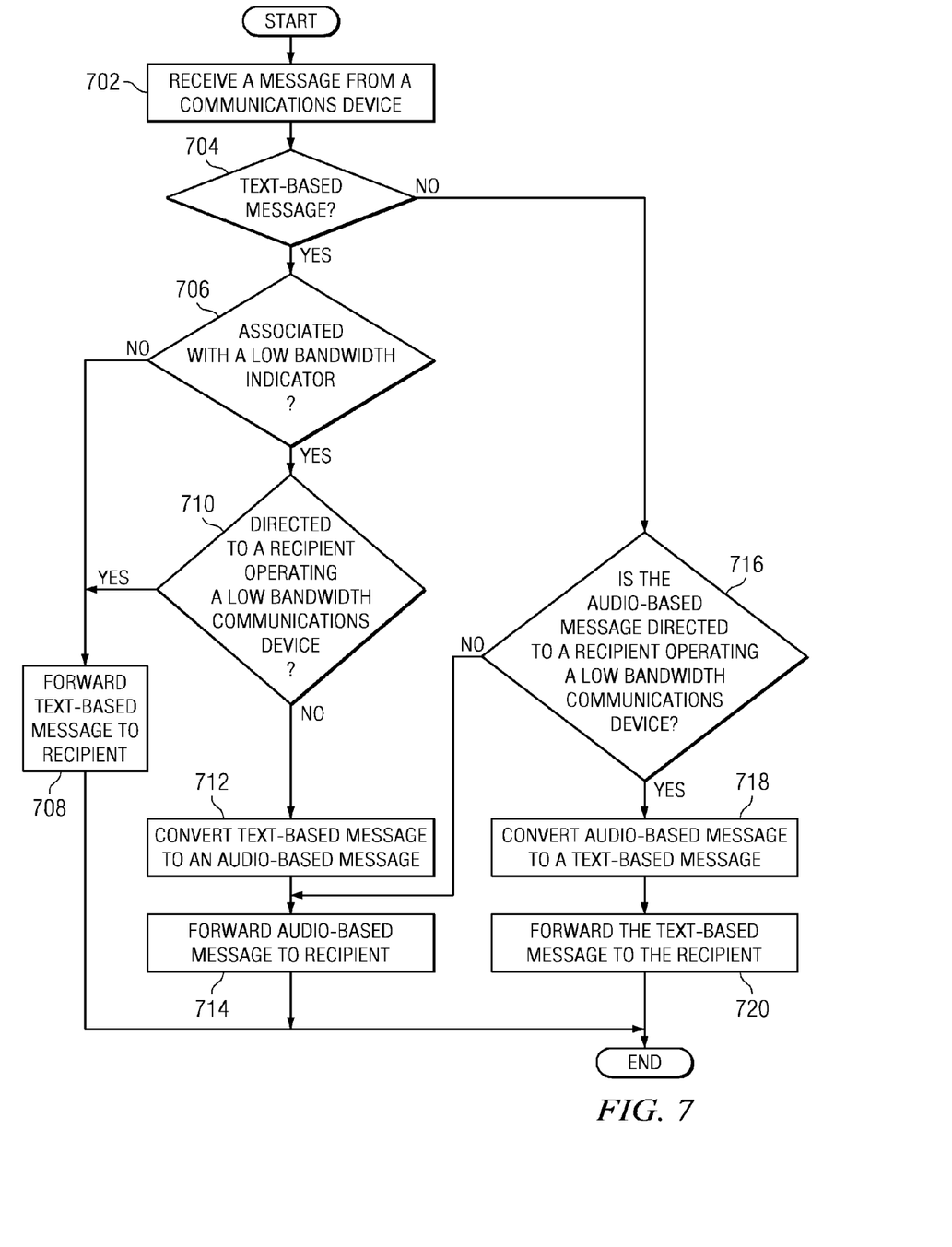
FIG. 7 is a flowchart of a process for facilitating a communications session by a communications gateway in accordance with an illustrative embodiment.

FIG. 7 is a flowchart of a process for managing communications sessions by a communications gateway in accordance with an illustrative embodiment. The process may be performed by a software component, such as message manager 504 in FIG. 5.

The process begins by receiving a message from a communications device (step 702). The message may be an audio-based message or a text-based message. Thereafter, the process then makes the determination as to whether the message is a text-based message (step 704). If the process makes the determination that the message is a text-based message, the process then makes the determination as to whether the text-based message is associated with a low bandwidth indicator (step 706). If the process makes the determination that the text-based message is not associated with a low bandwidth indicator, then the process forwards the text-based message to the intended recipient (step 708). The process terminates thereafter.

Returning now to step 706, if the process makes the determination that the text-based message is associated with a low bandwidth indicator, then the process makes the determination as to whether the text-based message is directed to a recipient operating a low bandwidth communications device (step 710). If the process makes the determination that the text-based message is directed to a recipient operating a low bandwidth communications device, then the process returns to step 708. If, however, the process makes the determination that the process is not directed to a recipient operating a low bandwidth communications device, then the process converts the text-based message to an audio-based message (step 712). The process then forwards the audio-based message to the intended recipient (step 714) and the process terminates thereafter.

Returning now to step 704, if the process makes the determination that the message is not a text-based message, then the process makes the determination as to whether the audio-based message is directed to a recipient operating a low bandwidth communications device (step 716). The audio-based message may be a pre-recorded message, an audio-based message generated from a text-to-speech program, or a conversation originating from a user of a communications device.

If the process makes the determination that the audio-based message is not directed to a recipient operating a low bandwidth communications device, then the process continues to step 714. However, if the process makes the determination that the audio-based message is directed to a recipient operating a low bandwidth communications device, then the process converts the audio-based message to a text-based message (step 718). The process then forwards the text-based message to the intended recipient (step 720) and the process terminates thereafter.

Figure 8:
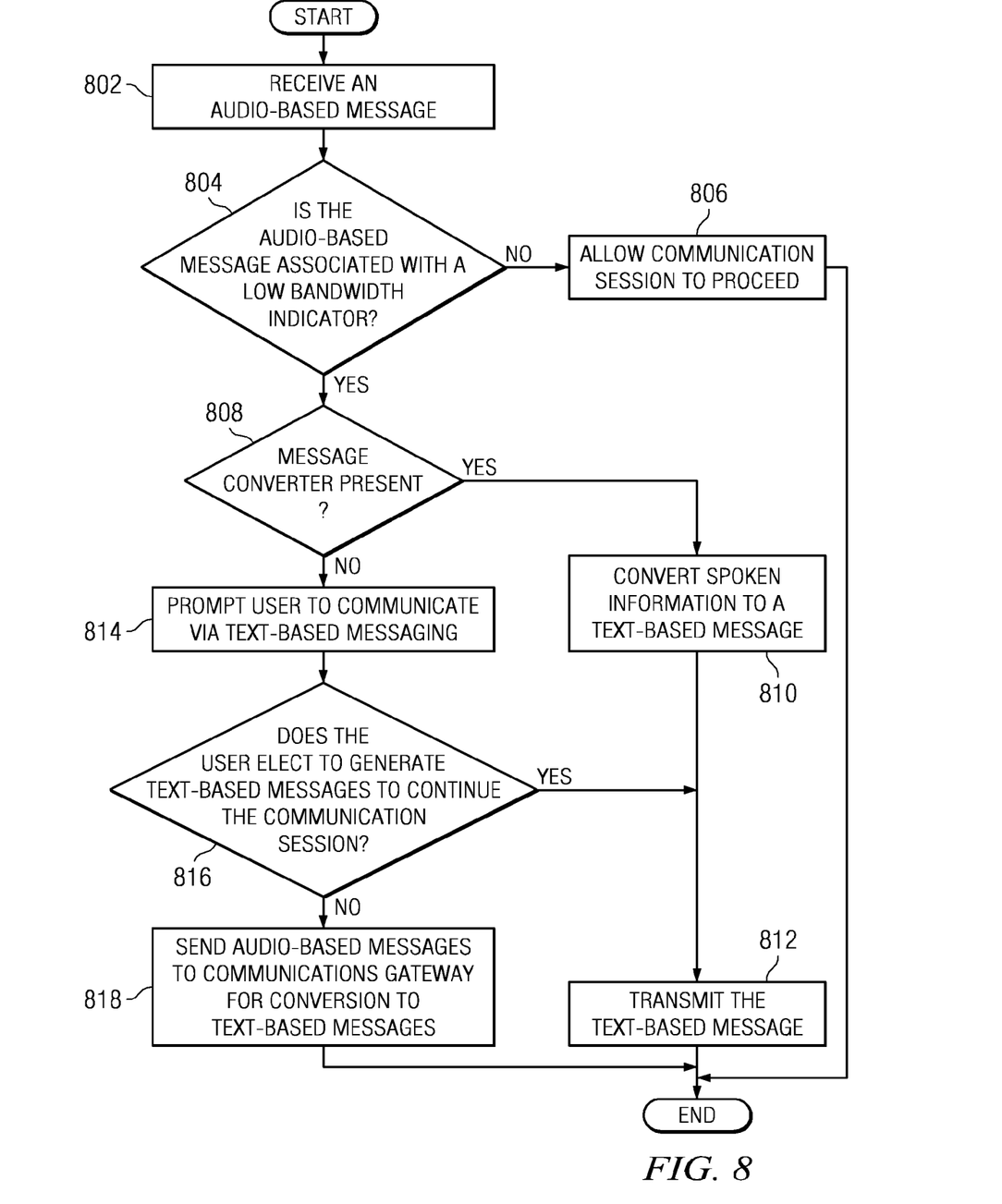
FIG. 8 is a flowchart of a process for managing a communications session on a communications device in communication with a low bandwidth communications device in accordance with an illustrative embodiment.

FIG. 8 is a flowchart of a process for managing a communication session on a communications device in communication with a low bandwidth communications device in accordance with an illustrative embodiment. The process may be performed by a software component such as call manager 318 in FIG. 3, during the course of a conversation.

The process begins by receiving an audio-based message (step 802). The audio-based message may be received from a communications gateway or directly from another communications device, such as a voice over Internet Protocol telecommunications apparatus. The process makes the determination as to whether the audio-based message is associated with a low bandwidth indicator (step 804). If the audio-based message is not associated with a low bandwidth indicator, then the process allows the communication session to proceed (step 806) and the process terminates thereafter.

If, however, the audio-based message is associated with a low bandwidth indicator, then the process makes the determination as to whether the receiving communications device has a message converter (step 808). If the process makes the determination that the receiving communications device has a message converter, then the process converts spoken messages generated at the receiving communications device to a text-based message (step 810). The process then transmits the text-based message (step 812) and the process terminates thereafter. The text-based message may be transmitted to a communications gateway for delivery to an intended recipient, or the text-based message may be transmitted directly to the other party to the conversation.

Returning now to step 808, if the process makes the determination that the receiving communications device does not have a speech-to-text converted, then the process prompts the user to communicate via text-based messaging (step 814). Text-based messaging may be, for example, a text message, an email, or an instant message. The process then makes the determination as to whether the user elects to generate text-based messages to continue the communication session (step 816).

If the process makes the determination that the user does elect to continue the communication session, then the process continues to step 812. However, if the process makes the determination that the user does not elect to generate text-based messages to continue the communication session, then the process forwards audio-based messages generated by a user of the receiving communications device to a communications gateway for conversion to text-based messages (step 818). The process terminates thereafter.

The flowcharts and block diagrams in the different depicted embodiments illustrate the architecture, functionality, and operation of some possible implementations of methods, apparatus, and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the illustrative embodiments provide a computer implemented method, apparatus, and computer usable program product for managing a communications session. The process monitors a bandwidth of the communications device in response to detecting an exchange of audio-based messages on a communications device. In response to detecting the bandwidth below a threshold, the process converts a subsequent outgoing audio based-message into an outgoing text-based message and associates a low bandwidth indicator to the outgoing text-based message to form a distinguished text-based message. The process then transmits the distinguished text-based message for receipt by an intended recipient.

The computer implemented method and apparatus disclosed herein facilitates communication between users operating communications devices that may experience periodic bouts of low bandwidth. By converting audio-based messages to text-based messages, participants of a communications session may elect to continue the communications session without fear of interruption and loss of information because the exchange of text-based messages requires less bandwidth. Consequently, messages may be delivered in their entirety. Users will be less likely to suffer from frustration and confusion, and important information will not be lost. These benefits are examples of benefits that may be experienced using the illustrative embodiments described above. Different benefits may be experienced depending upon the various combinations of embodiments.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable data storage medium providing program instructions for use by or in connection with a computer or any instruction execution system. For the purposes of this description, a computer-usable or computer-readable data storage medium can be any tangible apparatus that can store the program for use by or in connection with the instruction execution system, apparatus, or device.

The data storage medium can be an electronic, magnetic, optical, or semiconductor system (or apparatus or device). Examples of a computer-readable data storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing a communications session, the method comprising the steps of:
    responsive to a communications device detecting an exchange of audio-based messages on the communications device, the communications device monitoring a bandwidth of the communications device;
    responsive to the communications device detecting the bandwidth of the communications device below a predetermined bandwidth threshold level, the communications device converting an outgoing audio-based message into an outgoing text-based message;
    the communications device incorporating a low bandwidth indicator into the outgoing text-based message; and
    the communications device transmitting the outgoing text-based message with the low bandwidth indicator incorporated into the outgoing text-based message to a receiving communications device associated with an intended recipient.

2. The method of claim 1, wherein the step of the communications device converting the outgoing audio-based message into the outgoing text-based message comprises the communications device using a message converter located in the communications device to convert the outgoing audio-based message into the outgoing text-based message.

3. The method of claim 1, further comprising the steps of:
    responsive to the communications device receiving an incoming audio-based message, the communications device determining whether the incoming audio-based message has an associated low bandwidth indicator;
    responsive to the communications device determining that the incoming audio-based message has an associated low bandwidth indicator, the communications device converting an audio-based message that is responsive to the incoming audio-based message to a text-based message that is responsive to the incoming audio-based message; and
    the communications device transmitting the text-based message that is responsive to the incoming audio-based message to the receiving communications device associated with the intended recipient.

4. The method of claim 1, wherein the step of the communications device monitoring the bandwidth of the communications device comprises the communications device identifying a signal strength of the communications device.

5. The method of claim 4, wherein the step of the communications device identifying the signal strength of the communications device comprises the communications device monitoring a distance of the communications device from a wireless communications tower and the communications device calculating an estimated available bandwidth to the communications device based on the distance of the communications device from the wireless communications tower.

6. The method of claim 1, wherein the step of the communications device monitoring the bandwidth of the communications device comprises the communications device periodically sending test data packets to a server via a network to measure a latency of the network.

7. A computer program product for managing a communications session, the computer program product comprising:
    one or more computer-readable tangible storage devices;
    program instructions, stored on at least one of the one or more computer-readable tangible storage devices, to monitor a bandwidth of a communications device in response to detecting an exchange of audio-based messages on the communications device;
    program instructions, stored on at least one of the one or more computer-readable tangible storage devices, to convert an outgoing audio-based message into an outgoing text-based message in response to detecting the bandwidth of the communications device below a predetermined bandwidth threshold level;
    program instructions, stored on at least one of the one or more computer-readable tangible storage devices, to incorporate a low bandwidth indicator into the outgoing text-based message; and
    program instructions, stored on at least one of the one or more computer-readable tangible storage devices, to transmit the outgoing text-based message with the low bandwidth indicator incorporated into the outgoing text-based message to a receiving communications device associated with an intended recipient.

8. The computer program product of claim 7, wherein the program instructions to convert the outgoing audio-based message into the outgoing text-based message comprise program instructions to use a message converter located in the communications device to convert the outgoing audio-based message to the outgoing text-based message.

9. The computer program product of claim 7, further comprising:
    program instructions, stored on at least one of the one or more computer-readable tangible storage devices, to determine whether an incoming audio-based message has an associated low bandwidth indicator in response to the communications device receiving the incoming audio-based message;
    program instructions, stored on at least one of the one or more computer-readable tangible storage devices, to convert an audio-based message that is responsive to the incoming audio-based message to a text-based message that is responsive to the incoming audio-based message in response to determining that the incoming audio-based message has an associated low bandwidth indicator; and
    program instructions, stored on at least one of the one or more computer-readable tangible storage devices, to transmit the text-based message that is responsive to the incoming audio-based message to the receiving communications device associated with the intended recipient.

10. The computer program product of claim 7, wherein the program instructions to monitor the bandwidth of the communications device comprise program instructions to identify a signal strength of the communications device.

11. The computer program product of claim 10, wherein the program instructions to identify the signal strength of the communications device comprise program instructions to monitor a distance of the communications device from a wireless communications tower and calculate by the communications device an estimated available bandwidth to the communications device based on the distance of the communications device from the wireless communications tower.

12. The computer program product of claim 7, wherein the program instructions to monitor the bandwidth of the communications device comprise program instructions to periodically send test data packets to a server via a network to measure a latency of the network.

13. A communications device for managing a communications session, the communications device comprising:
- one or more processors, one or more computer-readable memories, and one or more computer-readable tangible storage devices;
- program instructions, stored on at least one of the one or more computer-readable tangible storage devices for execution by at least one of the one or more processors via at least one of the one or more computer-readable memories, to monitor a bandwidth of the communications device in response to detecting an exchange of audio-based messages on the communications device;
- program instructions, stored on at least one of the one or more computer-readable tangible storage devices for execution by at least one of the one or more processors via at least one of the one or more computer-readable memories, to convert an outgoing audio-based message into an outgoing text-based message in response detecting the bandwidth of the communications device below a predetermined bandwidth threshold level;
- program instructions, stored on at least one of the one or more computer-readable tangible storage devices for execution by at least one of the one or more processors via at least one of the one or more computer-readable memories, to incorporate a low bandwidth indicator into the outgoing text-based message; and
- program instructions, stored on at least one of the one or more computer-readable tangible storage devices for execution by at least one of the one or more processors via at least one of the one or more computer-readable memories, to transmit the outgoing text-based message with the low bandwidth indicator incorporated into the outgoing text-based message to a receiving communications device associated with an intended recipient.

14. The communications device of claim 13, wherein the program instructions to convert the outgoing audio-based message into the outgoing text-based message comprise program instructions to use a message converter located in the communications device to convert the outgoing audio-based message to the outgoing text-based message.

15. The communications device of claim 13, further comprising:
- program instructions, stored on at least one of the one or more computer-readable tangible storage devices for execution by at least one of the one or more processors via at least one of the one or more computer-readable memories, to determine whether an incoming audio-based message has an associated low bandwidth indicator in response to receiving the incoming audio-based message;
- program instructions, stored on at least one of the one or more computer-readable tangible storage devices for execution by at least one of the one or more processors via at least one of the one or more computer-readable memories, to convert an audio-based message that is responsive to the incoming audio-based message to a text-based message that is responsive to the incoming audio-based message in response to determining that the incoming audio-based message has an associated low bandwidth indicator; and
- program instructions, stored on at least one of the one or more computer-readable tangible storage devices for execution by at least one of the one or more processors via at least one of the one or more computer-readable memories, to transmit the text-based message that is responsive to the incoming audio-based message to the receiving communications device associated with the intended recipient.

16. The communications device of claim 13, wherein the program instructions to monitor the bandwidth of the communications device comprise program instructions to identify a signal strength of the communications device.

17. The communications device of claim 16, wherein the program instructions to identify the signal strength of the communications device comprise program instructions to monitor a distance of the communications device from a wireless communications tower and calculate an estimated available bandwidth to the communications device based on the distance of the communications device from the wireless communications tower.

18. The communications device of claim 13, wherein the program instructions to monitor the bandwidth of the communications device comprise program instructions to periodically send test data packets to a server via a network to measure a latency of the network.

* * * * *